United States Patent

Van Ordt

[15] 3,658,219
[45] Apr. 25, 1972

[54] AUTOMOBILE FLOOR HUMP STRADDLE MOUNT FOR AUTOMOTIVE ACCESSORY

[72] Inventor: Jay H. Van Ordt, 10871 South Grand, Ontario, Calif. 91762

[22] Filed: Apr. 17, 1970

[21] Appl. No.: 29,545

[52] U.S. Cl. .................................224/42.42 R, 214/42.45 R
[51] Int. Cl. ..........................................................B60r 7/00
[58] Field of Search ........................248/128; 297/232, 113; 206/19.5 R, 19.5 B; 224/29, 42.42, 42.11

[56] References Cited

UNITED STATES PATENTS 2,969,900   1/1961   Heuler ............................224/42.42 X
2,899,162   8/1959   Young ..................................224/29 X
3,371,976   3/1968   Ritz, Jr. ..........................206/19.5 B X Primary Examiner—Gerald M. Forlenza
Assistant Examiner—Robert J. Spar
Attorney—Boniard I. Brown

[57] ABSTRACT

A straddle mount for removably or semi-permanently mounting an accessory, such as a radio, stereo tape player or the like, in an automobile having a drive shaft clearance hump rising from the floor along the longitudinal centerline of the vehicle. The straddle mount has a channel shaped base for fitting over the floor hump in straddling relation to the base, and a riser attached to the top wall member of the base including an upper mounting plate which slopes upwardly in the rearward direction and is equipped with brackets having upstanding bracket arms for straddling and mounting the accessory to be installed. The base and brackets are adjustable to accommodate a range of floor hump and accessory sizes.

9 Claims, 7 Drawing Figures

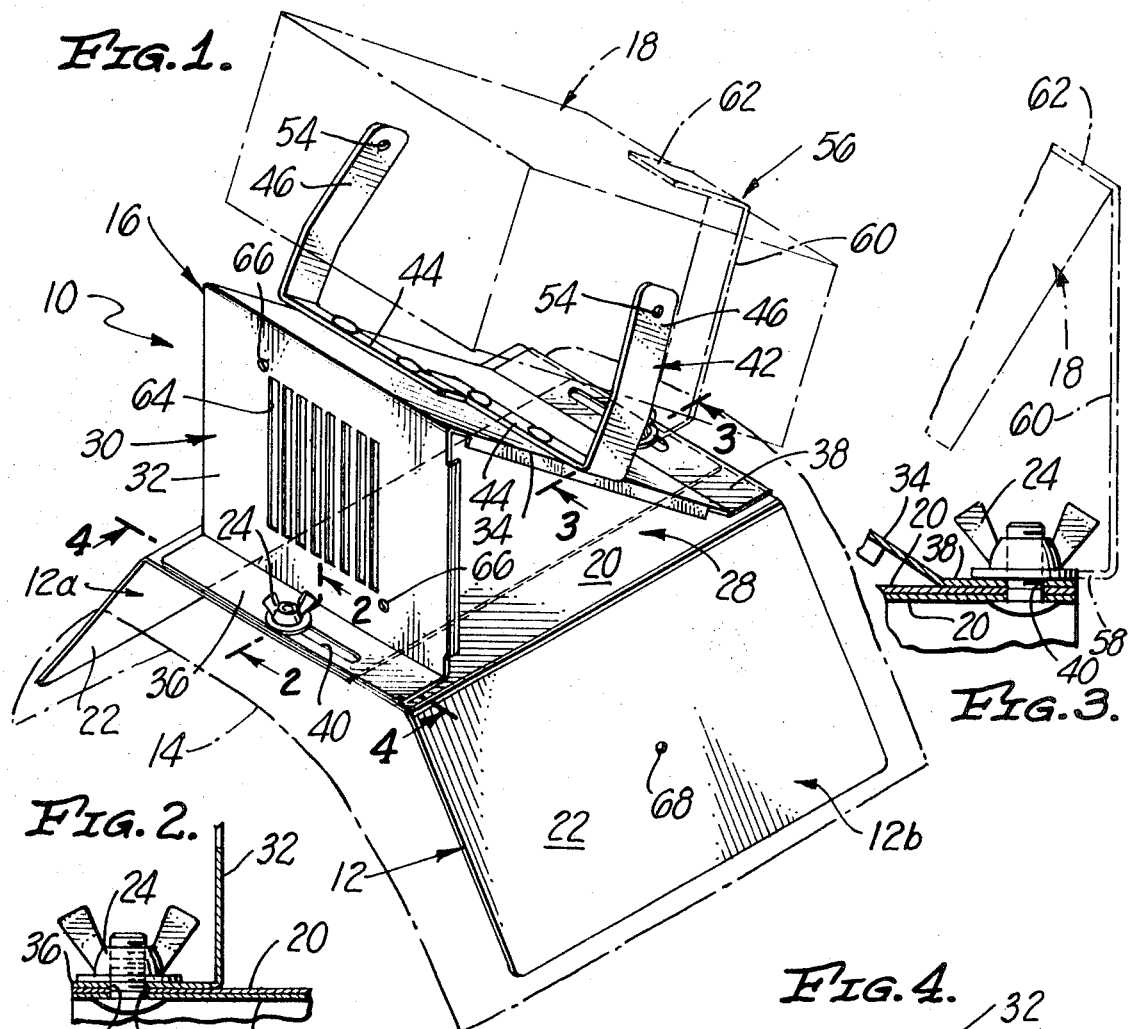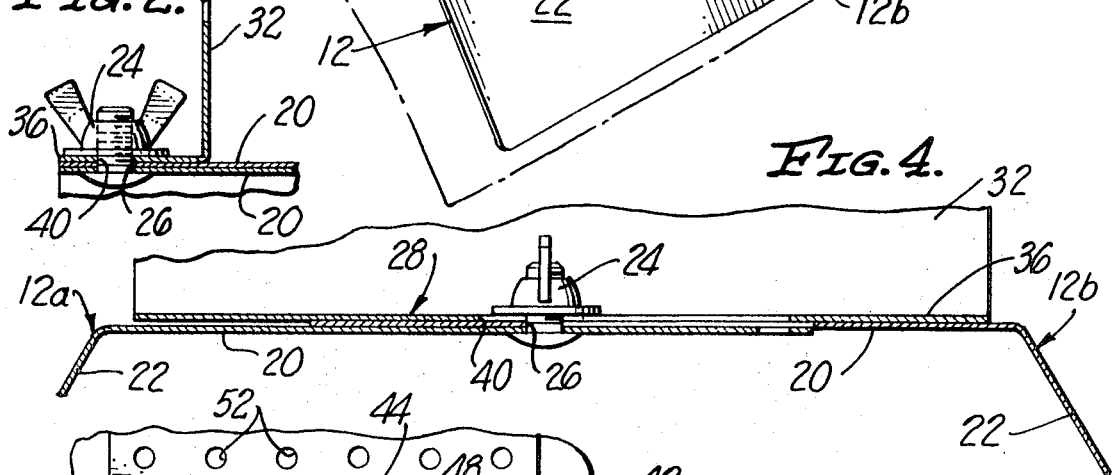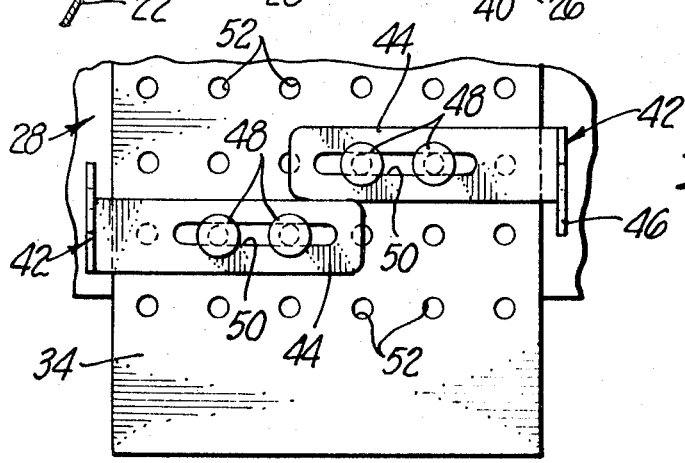

INVENTOR
JAY H. VAN ORDT
BY
ATTORNEY

AUTOMOBILE FLOOR HUMP STRADDLE MOUNT FOR AUTOMOTIVE ACCESSORY

BACKGROUND OF THE INVENTION

1. Field of the Invention

This invention relates generally to the field of mounting an accessory, such as a radio, stereo tape player or the like, in an automobile. The invention relates more particularly to a straddle mount for removably or semi-permanently mounting an accessory over the drive shaft clearance hump on the floor of an automobile.

2. Prior Art

A great variety of accessories are currently available for use in automobiles. The most common accessories of this kind, for example, are conventional radios, amateur radio equipment, citizen's hand radio equipment, and stereo tape players.

The installation of such accessories presents three major problems with which the present invention is concerned. These problems are (1) lack of mounting space on the underside of the dash panel, (2) inability of many dash panels, such as the new plastic panels, to support the weight of additional equipment, and (3) the possibility of theft of an accessory which is permanently installed on the dash. This latter problem of theft is particularly acute in the case of the accessories listed above and presents an especially serious hazard for equipment installed in a convertible.

SUMMARY OF THE INVENTION

The present invention provides a novel accessory mount which is designed for use in automobiles having a hump rising from the floor along the longitudinal centerline of the vehicle to provide clearance for the vehicle drive shaft and which avoids the above noted and other problems associated with conventional automotive accessory mounts. The present accessory mount, referred to hereafter as a straddle mount, has a channel shaped base to be placed over the floor hump in straddling relation to the hump, and an accessory mounting riser attached to the top wall member of the base. This riser has an upper accessory mounting plate which slopes upwardly in the rearward direction of the straddle mount and carries accessory mounting brackets with upstanding arms for straddling and mounting the accessory to be installed.

According to one feature of the invention, the depending side wall members of the straddle mount base are resiliently flexible to frictionally grip the floor hump with sufficient force to resist the acceleration and deceleration forces encountered in normal driving. If desired, the straddle mount may be bolted to the floor hump to resist impact forces, such as may be encountered in an accident. Simple frictional retention of the base on the floor hump is preferred for the reason that the entire straddle mount and its accessory may be easily removed and placed in the trunk to prevent theft when the vehicle is left unattended. However, the base may be releasably attached to the floor hump in such a way as to resist impact forces on the vehicle and yet permit removal of the straddle mount with relative ease.

According to another feature of invention, the base and accessory mounting brackets of the straddle mount are adjustable to accommodate a range of floor hump and accessory sizes. The base may be shaped in cross-section to only approximate or match quite closely the cross-section of the floor hump.

BRIEF DESCRIPTION OF THE DRAWINGS

FIG. 1 is a perspective view of a present accessory straddle mount;

FIG. 2 is an enlarged section taken on line 2—2 in FIG. 1;

FIG. 3 is an enlarged section taken on line 3—3 in FIG. 1;

FIG. 4 is an enlarged section taken on line 4—4 in FIG. 1;

FIG. 5 is an enlarged fragmentary plan view of the accessory mounting brackets of the straddle mount;

DESCRIPTION OF THE PREFERRED EMBODIMENTS

Figure 6:
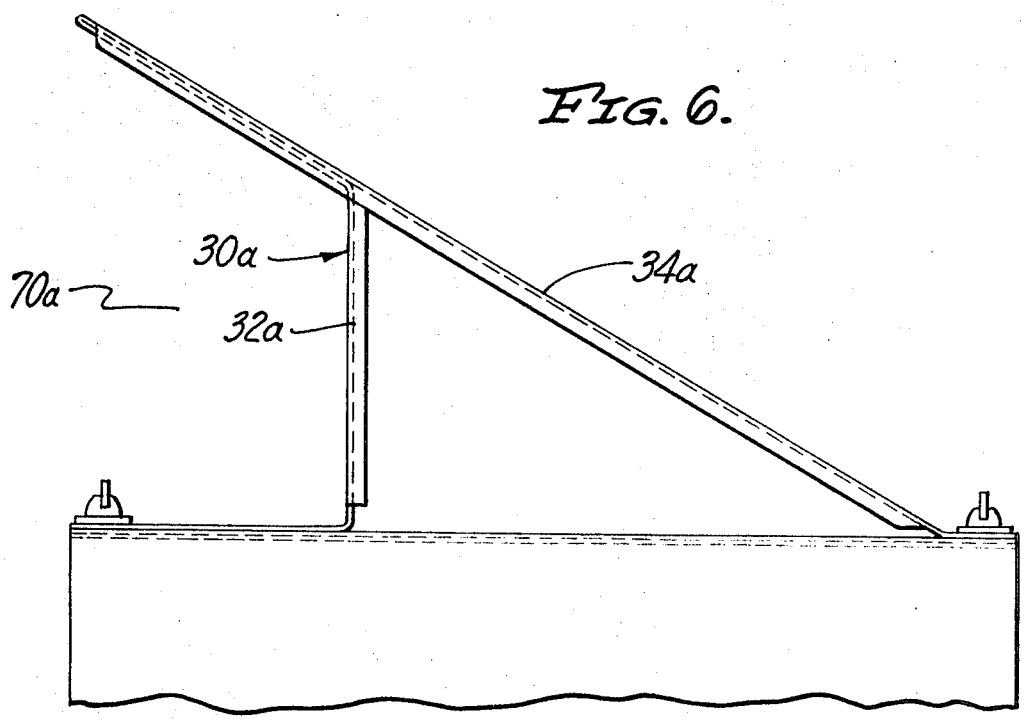
FIG. 6 is a side elevation of a modified straddle mount according to the invention.

The automobile floor hump straddle mount 10 illustrates in FIGS. 1-5 of the drawings includes a generally channel shaped base 12 to be placed over the drive shaft clearance hump 14 on the floor of an automobile, and means 16 for mounting an automotive accessory 18, such as a radio, stereo tape player, or the like, over the base. The base 12 of the illustrated straddle mount is adjustable to accommodate a range of floor hump sizes and includes a pair of relatively adjustable sheet metal sections 12a, 12b. These base sections have slidably overlapping top wall portions 20 and side wall members 22 depending from the outer longitudinal edges of the top wall portions. The top wall portions 20 of the base sections 12a, 12b are joined by fasteners 24 which pass through slots 26 in one wall portion extending in the direction of their overlap. Fasteners 24 may thus be released to adjust the base side wall members 22 toward and away from one another, and thereby accommodate the base to a range of floor hump sizes, and tightened to retain the side wall members in adjusted position and firmly join the top wall portions 20 to form a base top wall member 28.

The accessory mounting means 16 of the illustrated straddle mount comprises a sheet metal riser 30 having a rear panel 32 rising from the base top wall member 28, adjacent its rear edge, and an upper forward accessory mounting plate 34 extending from the upper edge of the riser panel to the front edge of the top wall member. Thus, the mounting plate slopes upwardly in the rearward direction of the straddle mount. Along the lower edges of the riser panel 32 and mounting plate 34 are flanges 36, 38 which seat against the base top wall member 28. These flanges have slots 40 through which pass the base fasteners 24, whereby the fasteners serve the dual function of joining the adjustable base sections 12a, 12b to one another and attaching the riser 30 to the base top wall member.

Riser mounting plate 34 carries a pair of accessory mounting brackets 42. Each mounting bracket has a lower arm 44 which seats on the base top wall member 28 and an upstanding arm 46 rising from the outer end of the lower arm for straddling the accessory 18 to be installed. The lower bracket arms 44 are attached to the top wall member 28 by bolts 48 which pass through slots 50 in the arms and holes 52 in the wall member. The base top wall member is provided with a multiplicity of fastener holes 52, such that the brackets 42 are adjustable both longitudinally of the lower bracket arms 44, to vary the spacing between the upstanding bracket arms 46, and laterally of the lower arms, to vary the position of the brackets in the fore and aft direction of the base 12. The upper ends of the upstanding bracket arms 46 are apertured at 54 to receive fasteners (not shown) for attaching the arms to the accessory 18 to be installed. As shown best in FIG. 5, the upstanding bracket arms 46 are offset in opposite lateral directions of their respective lower arms 44 so that the upstanding arms are aligned laterally of the straddle mount.

In some cases, it may be desirable or essential to provide an accessory stabilizing bracket 56 at the front end of the straddle mount. The illustrated stabilizing bracket has a lower arm 58 secured to the base 12 by the front base fastener 24 and an upstanding arm 60 which rises from the front end of the lower arm and terminates in a forwardly bent portion 62 for engaging over the front end of the mounted accessory 18 to position the latter in generally parallel relation to the riser mounting plate 34.

In some cases, the mounted accessory 18 may have a separate speaker. The illustrated straddle mount provides for installation of such a speaker. To this end, the rear panel 32 of the riser 30 has slot shaped openings 64 and means 66, in this instance mounting bolt receiving openings, for attaching the speaker to the inner front facing side of the panel.

The present straddle mount is installed by placing it over the vehicle floor hump 14 in such a way that the base side wall members 22 straddle the hump, as shown. According to a feature of the invention, these wall members are resiliently flexible and adjustable to frictionally grip the hump with sufficient force to withstand the acceleration and deceleration forces encountered in normal driving. If desired, the base side wall members may be apertured at 68 to receive fasteners (not shown) for securing the base 12 to the hump so as to resist impact forces on the vehicle, such as are encountered in an accident. In either case, the straddle mount may be quickly and easily removed for storage in the trunk to avoid theft when the vehicle is left unattended.

The modified accessory straddle mount 10a illustrated in FIG. 6 is essentially identical to the mount 10 of FIGS. 1–5. Mount 10a differs from mount 10 in that the riser 30a of mount 10a has an upper accessory mounting plate 34a which extends rearwardly of the rear riser panel 32a to provide a space 70a for receiving a battery pack for the installed accessory. In this case, the riser may be fashioned from a single bent sheet of metal or from two bent sheet metal parts which are welded or otherwise firmly joined.

Figure 7:
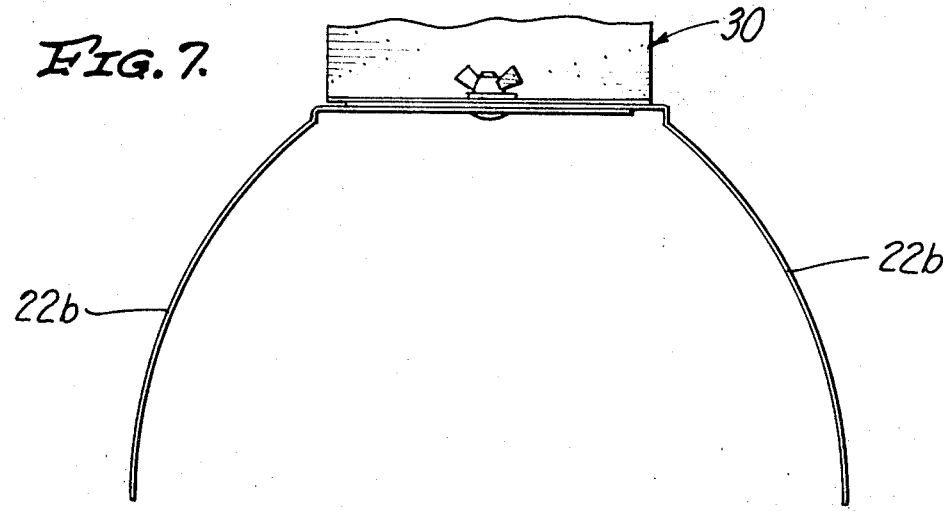
FIG. 7 is an end elevation of a further modified straddle mount according to the invention.

The base of the straddle mounts described thus far have planar side wall members, such that the base conforms only generally in cross-section to that of the automobile floor hump 14. As shown in FIG. 7, the side wall members 22b of the base may be arcuate in shape to conform more closely to the cross-section of the hump.

What is claimed as new in support of Letters Patent is:

1. An automobile floor hump straddle mount for an accessory, such as a radio, stereo tape player, or the like, comprising:
   a generally channel shaped base adapted to be placed over said floor hump and including a top wall member for extending across the top of said hump and side wall members depending from opposite longitudinal edges of said top wall member for straddling said hump, and
   accessory mounting means on said top wall member for attaching said accessory to said base comprising a riser having a rear upstanding panel rising from said top wall member adjacent the rear edge thereof and an accessory mounting plate extending from the upper edge of said panel to the front edge of said top wall member in forwardly converging relation to said top wall member, whereby said mounting plate slopes upwardly in the rearward direction of said mount, bracket arms on said mounting plate for straddling said accessory, and means for securing said arms to said accessory.

2. A straddle mount according to claim 1 wherein:
   said accessory mounting means further comprise means for adjusting the spacing between said bracket arms to accommodate accessories of differing size.

3. A straddle mount according to claim 1 wherein:
   said riser panel has openings and means for mounting a speaker on the inner forwardly facing side of the panel.

4. A straddle mount according to claim 1 wherein:
   said depending base side wall members are resiliently flexible to frictionally grip said floor hump, and said mounting means includes means for adjusting the spacing between said side wall members to accommodate floor humps of differing size.

5. An automobile floor hump straddle mount for an accessory, such as a radio, stereo tape player, or the like, comprising:
   a generally channel shaped base adapted to be placed over said floor hump including a pair of adjustable sections having slidably overlapping top wall portions, fasteners extending through slots in said wall portions for joining the latter to form a top wall member for extending across the top of said floor hump, and side wall members depending from the outer edges of said wall portions for straddling said hump,
   said slots extending in the direction of overlap of said top wall portions and said fasteners being releasable to permit adjustment of the spacing between said side wall members for accommodating floor humps of differing size,
   an accessory mounting riser on said top wall member including a panel rising from said top wall member adjacent its rear edge and having a flange seating against said top wall member, an accessory mounting plate extending from the upper edge of said panel to the front edge of said top wall member and having a flange seating against said top wall member, said mounting plate sloping upwardly in the rearward direction of said straddle mount, and said riser flanges having openings receiving said fasteners for securing said riser to said base,
   brackets on said mounting plate having upstanding arms for straddling said accessory,
   means adjustably securing said brackets to said mounting plate for adjusting the spacing between said bracket arms to accommodate accessories of differing size, and
   means for securing said arms to said accessory.

6. A straddle mount according to claim 5 wherein:
   said base side wall members are resiliently flexible to frictionally grip said floor hump.

7. A straddle mount according to claim 5 wherein:
   said riser panel has openings and includes means for securing a speaker to the inner forwardly facing side of the panel.

8. A straddle mount according to claim 5 wherein:
   the rear upper end of said riser mounting plate extends rearwardly of said riser panel and over said base top wall member to provide a battery space at the rear side of said panel.

9. A straddle mount according to claim 5 wherein:
   said upstanding bracket arms are provided with mounting openings and are offset in opposite lateral directions longitudinally of said mounting plate to locate said openings in coaxial alignment.

* * * * *